No. 667,619. Patented Feb. 5, 1901.
T. W. EATON.
CONTROLLER FOR ELECTRIC MOTORS.
(Application filed Oct. 8, 1900.)
(No Model.) 2 Sheets—Sheet 2.
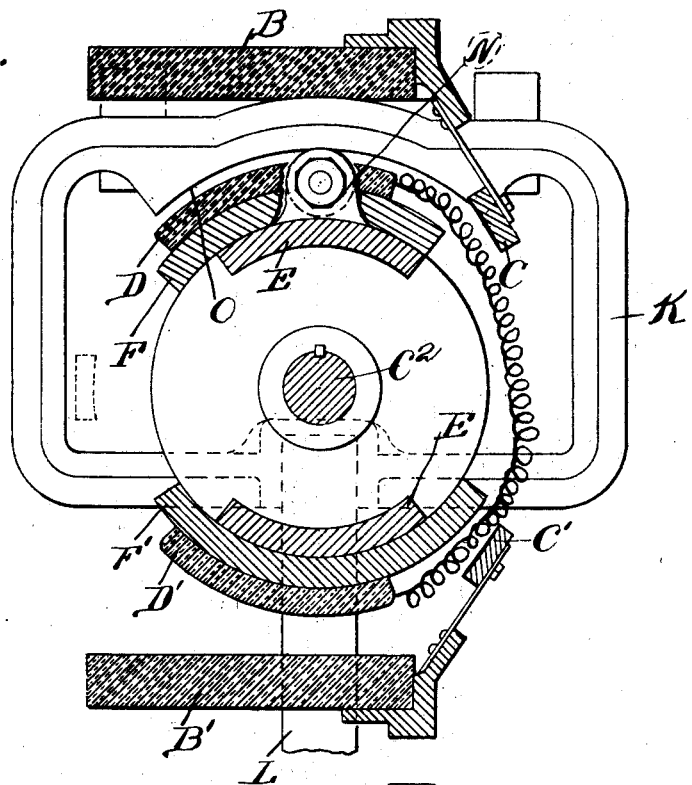
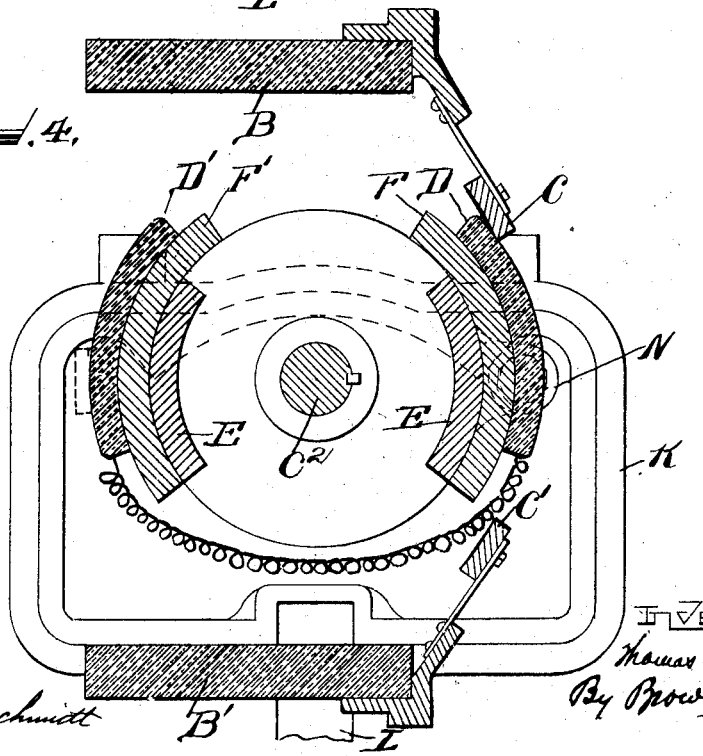

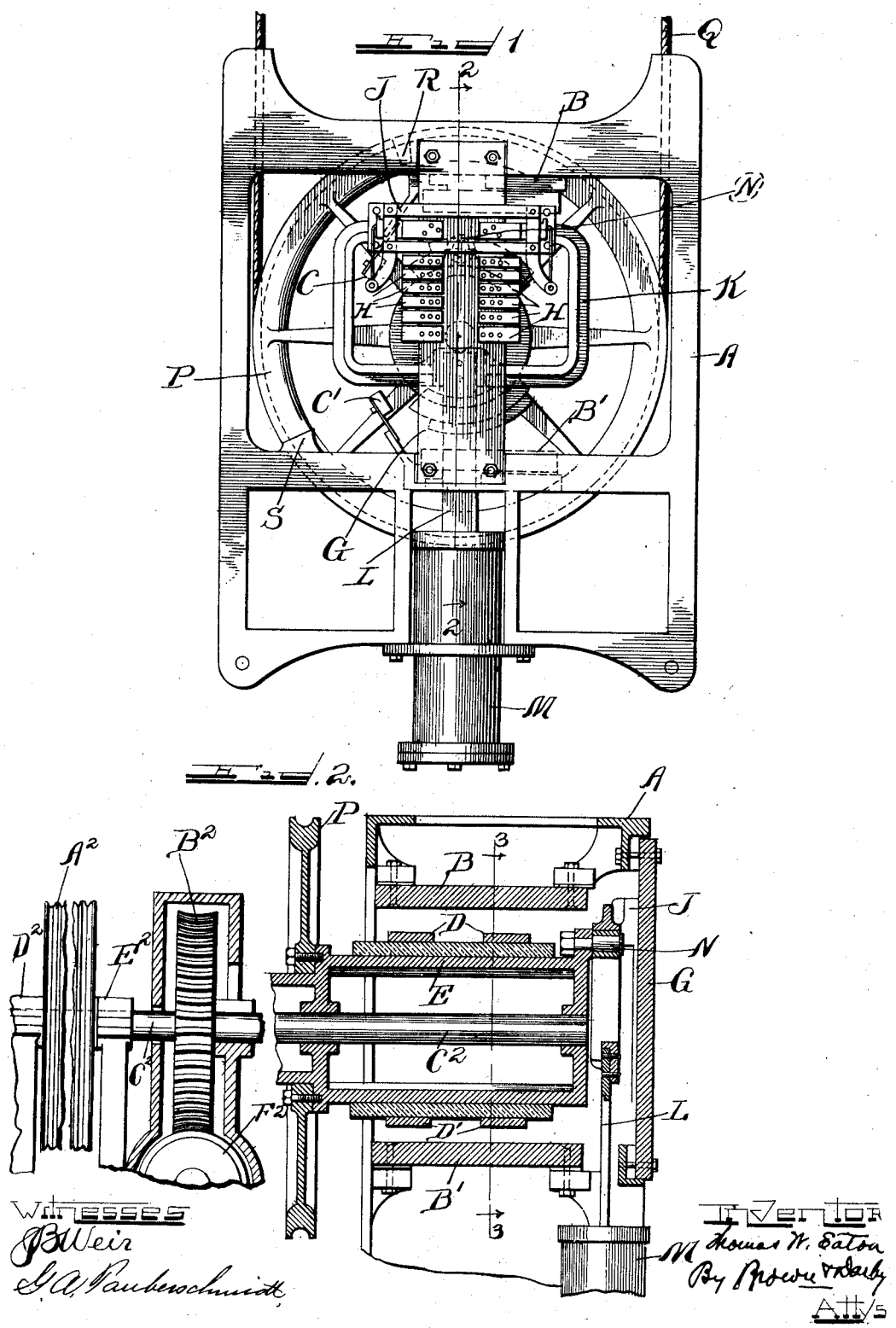

UNITED STATES PATENT OFFICE.

THOMAS W. EATON, OF CHICAGO, ILLINOIS, ASSIGNOR TO THE EATON & PRINCE COMPANY, OF SAME PLACE.

CONTROLLER FOR ELECTRIC MOTORS.

SPECIFICATION forming part of Letters Patent No. 667,619, dated February 5, 1901.

Application filed October 8, 1900. Serial No. 32,415. (No model.)

*To all whom it may concern:*

Be it known that I, THOMAS W. EATON, a citizen of the United States, residing at Chicago, in the county of Cook and State of Illinois, have invented a new and useful Controller for Electric Motors, of which the following is a specification.

This invention relates to controllers for electric motors.

One object of the invention is to provide a controller which is simple in construction and efficient in operation.

A further object of the invention is to provide a controller for electric motors wherein the resistances in the motor-circuit may be readily and automatically cut out of or into circuit in a simple and efficient manner.

A further object of the invention is to provide a simple and efficient construction of motor-controller for reversing and breaking the motor-circuits.

Other objects of the invention will appear more fully hereinafter.

The invention consists, substantially, in the construction, combination, location, and arrangement, all as will be more fully hereinafter set forth, as shown in the accompanying drawings, and finally pointed out in the claims.

Referring to the accompanying drawings and to the various views and reference-signs appearing thereon, Figure 1 is a view in end elevation of a controller embodying the principles of my invention. Fig. 2 is a broken view in central longitudinal section on the line 2 2, Fig. 1. Fig. 3 is a transverse section on the line 3 3, Fig. 2. Fig. 4 is a view similar to Fig. 3, showing a displaced position of the parts.

The same part is designated by the same reference-sign wherever it occurs throughout the several views.

In carrying out my invention I provide a series of suitably-supported contacts through which the resistances of the motor-circuit are controlled, and I arrange a contact-frame to travel over said series of contacts to cut the same into and out of working circuit, and I arrange said contact-frame to be moved by the controller-drum when the latter is actuated into position to cut the motor-resistances into circuit and to be automatically moved in a direction to successively cut out of circuit such resistances, the movement due to the actuation of the controller-drum being a positive movement, and the movement in the opposite direction being effected by gravity and controlled in any suitable manner—as, for instance, by means of a dash-pot—and I arrange said movable contact-frame to be held in stationary position during a portion of the movement of the controller-drum, as will be more fully explained hereinafter.

In the accompanying drawings I have shown a construction of controller embodying my invention as applied to the control of the hoisting-motor for electric elevators, although I desire it to be understood that my invention is not to be limited in respect to the use thereof. In the construction shown I employ the shaft upon which the elevator-hoisting drum is mounted and which receives rotation from the motor as a support for the controller-drum, and this forms one important feature of my invention.

Referring to the accompanying drawings, reference-sign A designates the controller-frame, in which are mounted suitable contact-plates B B' of insulating material, upon which plates or slabs are mounted the main contacts C C', with which coöperate contact-plates D D', carried upon the surface of the controller-drum E, but insulated therefrom, as by means of insulating-plates F F'. Suitably mounted upon the frame A is an insulating slab or plate G, upon which are carried the series of contact-plates H, through which the resistances of the motor-circuit are controlled. A contact-frame J is arranged to travel over the contact-plates H to effect the successive cutting in or out of said contacts in a manner well understood. The plate J is carried by a rectangular frame or bracket K, to which is connected a piston-rod L, arranged to operate in a cylinder M, said cylinder constituting a dash-pot to control the movement of said bracket or frame K in one direction. The movement of the frame K in the opposite direction is effected by means of a roller or projection N, operating within the rectangular frame K, said projection being carried by the controller-drum E, as most clearly shown in Figs. 2, 3, and 4. The inner surface of the rectangular frame or bracket K is provided with a circular track or surface (indicated at O in Fig. 3) struck from the center of rotation of projection N, the object of which is to permit of a travel of said roller or projection N through a certain distance of its travel without effecting a movement of frame K, for a purpose presently to be more fully explained. The controller-drum E may be actuated in any suitable or convenient manner—as, for instance, by means of a wheel P, through which a rocking or rotative movement may be imparted thereto, and when the controller is employed in connection with the motor of an electric elevator this pulley or wheel P may be rocked or rotated through a cable (indicated at Q) from the car in any suitable, convenient, and well-known manner. This wheel or some other convenient rotative part of the controller may be provided with a stop (indicated in dotted lines at R, Fig. 1) which coöperates with a stop or lug S to limit the rotative movement of the controller-drum.

From the foregoing description it will be seen by reference to Fig. 4 that the controller-drum contact D is in connection with the motor-circuit contact C and the projection or roller N is in position to begin the raising movement or travel of the bracket or frame K, which carries the movable resistance-controlling contact frame or plate J. Under this condition the motor is operating in one direction with all the resistances cut out of circuit, inasmuch as the frame or bracket K is occupying its lowermost position. Now by rotatively actuating the controller-drum the plate D travels along contact C in a direction to break the circuit connection therethrough and at the same time the bracket or frame K is being raised until, as shown in Fig. 3, finally the plate D leaves contact C and breaks the motor-circuit. Thereafter the continued movement of the controller-drum in the same direction is effected without raising or moving the bracket or frame K, the pin or roller N during such continued movement traveling in the curved surface or track O, as above explained. After a sufficient movement of the drum E to effect a contact between the points C' and plate D' to reverse the motor the roller or projection N will have passed the track or surface O and thereafter the frame or bracket K will be relieved of its support and will be free to fall by gravity until it again engages upon the projection or roller N, the fall being regulated and controlled by the dash-pot arrangement comprising the piston L and cylinder M, as above explained. The fall of the bracket or frame K effects a gradual cutting out of contacts H by reason of the travel of the contact frame or plate J thereover.

From the foregoing description it will be seen that the resistance-contacts are gradually and uniformly cut out of circuit and wholly independent of the movement of the controller-drum—that is to say, the cutting out of the motor resistances is effected uniformly, whatever may be the speed of rotative movement of the controller-drum. Thus I secure an exceedingly efficient and uniform action of the controller. It will also be seen that the bracket or frame K is held stationary during that portion of the travel of the controller-drum during which the motor-circuit is entirely broken.

Referring to Fig. 2, showing the application of a construction embodying my invention to the hoisting-motor of electric elevators, reference-sign $A^2$ designates the hoisting-drum; $C^2$, the drum-shaft, suitably journaled in bearings $D^2$ and $E^2$, and $B^2$ is the drive-wheel for shaft $C^2$, adapted to receive rotation from gear $F^2$, driven from the motor. The shaft $C^2$ is extended and has mounted thereon the controller-drum E. Thus I utilize the same shaft upon which the hoisting-drum and its driving-gear are mounted for the controller. By this construction I am enabled to arrange the controller mechanism in suitable and concentric relative arrangement with respect to the hoisting mechanism, and hence also greatly economize in the cost of construction.

It is obvious that many variations and changes in the details of construction and arrangement would readily suggest themselves to persons skilled in the art and still fall within the spirit and scope of my invention. I do not desire, therefore, to be limited to the exact details of construction and arrangement shown; but Having now set forth the object and nature of my invention and a construction embodying the principles thereof and having described such construction, its purpose, function, and mode of operation, what I claim as new and useful and of my own invention, and desire to secure by Letters Patent, is—

1. In a controller, fixed main contacts, a drum carrying coöperating movable contacts, said drum having a projection, in combination with a frame or bracket arranged to be engaged by said projection for movement in one direction, a contact-plate carried by said frame or bracket, and a series of auxiliary contacts with which said contact-plate coöperates, as and for the purpose set forth.

2. In a controller, a controller-drum, and means for rotatively moving the same, said drum provided with a projection, in combination with a bracket or frame arranged to be engaged by said projection, said bracket or frame carrying a contact-plate, and a series of auxiliary contacts with which said contact-plate coöperates, as and for the purpose set forth.

3. In a controller, a controller-drum having a projection, a rectangular frame within which said projection operates, whereby said frame is moved in one direction by said drum and in the other direction by gravity, a contact-plate carried by said frame, and a series of auxiliary contacts with which said plate coöperates, as and for the purpose set forth.

4. In a controller, a controller-drum having a projection, a bracket or frame having a rectangular opening within which said projection operates, whereby said frame is moved by said controller-drum in one direction and by gravity in the opposite direction, a contact-plate carried by said frame, a series of auxiliary contacts over which said contact-plate operates, and a dash-pot for controlling the gravity movement of said frame, as and for the purpose set forth.

5. In a controller, a supporting-shaft, a drum mounted for rotation thereon, an operating-wheel for said drum, said drum provided with a projection, a bracket or frame arranged to be engaged by said projection for movement in one direction and adapted to be moved by gravity in the opposite direction, a contact-plate carried by said bracket, and a series of auxiliary contacts over which said contact-plate operates, as and for the purpose set forth.

6. In a controller, a drum carrying a projection, a frame having an opening therein within which said projection operates, said frame provided with a curved track concentric with the axis of movement of said projection, a contact-plate carried by said frame, and a series of auxiliary contacts with which said contact-plate coöperates, as and for the purpose set forth.

7. In an electric elevator, a hoisting-drum, a shaft therefor, and means for rotating said shaft, in combination with a controller comprising movable and stationary coöperating contacts, said movable contacts being carried by said shaft, and means for moving said movable contacts relative to said shaft, as and for the purpose set forth.

8. In an electric elevator, a shaft provided with a drive-gear, a hoisting-drum on said shaft, a controller comprising a drum, carrying contacts and coöperating stationary contacts, said drum mounted upon said shaft, and means for rotatively actuating said drum relative to said shaft, as and for the purpose set forth.

9. In an electric elevator, a shaft, bearings therefor, a hoisting-drum mounted on said shaft, said shaft being extended beyond said bearings, a controller-drum mounted on the extended end of said shaft and carrying contacts, coöperating stationary contacts, and means for rotatively mounting said drum relative to said shaft, as and for the purpose set forth.

10. In an electric elevator, a hoisting-drum, a shaft therefor, a controller-drum mounted on said shaft for rotative movement relative thereto, and carrying contacts, coöperating stationary contacts, a series of auxiliary contacts, a frame carrying an auxiliary movable contact, and connections between said drum and auxiliary movable contact for actuating the latter, as and for the purpose set forth.

11. In an electric elevator, a hoisting-drum, a shaft therefor, bearings for said shaft, said shaft extending beyond said bearings, a controller mounted upon the extended end of said shaft, and carrying contacts, coöperating contacts, a series of stationary auxiliary contacts, an auxiliary movable contact operating thereover, means operated by the actuation of said controller-drum for moving said auxiliary movable contact in one direction against gravity, and means for controlling the movement of said auxiliary movable contact in the other direction, as and for the purpose set forth.

In witness whereof I have hereunto set my hand, this 1st day of October, 1900, in the presence of the subscribing witnesses.

THOMAS W. EATON.

Witnesses:
  FRANK T. BROWN,
  S. E. DARBY.